US012497576B2

(12) United States Patent
Shiva Naik et al.

(10) Patent No.: US 12,497,576 B2
(45) **Date of Patent: *Dec. 16, 2025**

(54) HARD SURFACE CLEANING COMPOSITION

(71) Applicant: CONOPCO, INC., Englewood Cliffs, NJ (US)

(72) Inventors: Maheshwara Shiva Naik, Bangalore (IN); Jiji Paul Kottukapally, Bangalore (IN)

(73) Assignee: Conopco Inc., Englewood Cliffs, NJ (US)

( * ) Notice: Subject to any disclaimer, the term of this patent is extended or adjusted under 35 U.S.C. 154(b) by 343 days.

This patent is subject to a terminal disclaimer.

(21) Appl. No.: 18/252,042

(22) PCT Filed: Nov. 18, 2021

(86) PCT No.: PCT/EP2021/082075

§ 371 (c)(1),
(2) Date: May 8, 2023

(87) PCT Pub. No.: WO2022/122331

PCT Pub. Date: Jun. 16, 2022

(65) Prior Publication Data

US 2024/0010947 A1 Jan. 11, 2024

(30) Foreign Application Priority Data

Dec. 7, 2020 (EP) .................................... 20212141

(51) Int. Cl.

| | |
|---|---|
| ***C11D 3/00*** | (2006.01) |
| ***C11D 1/94*** | (2006.01) |
| ***C11D 3/04*** | (2006.01) |
| ***C11D 3/37*** | (2006.01) |
| *C11D 1/14* | (2006.01) |
| *C11D 1/22* | (2006.01) |
| *C11D 1/29* | (2006.01) |
| *C11D 1/90* | (2006.01) |

(52) U.S. Cl.

CPC ................ *C11D 1/94* (2013.01); *C11D 3/046* (2013.01); *C11D 3/3707* (2013.01); *C11D 1/146* (2013.01); *C11D 1/22* (2013.01); *C11D 1/29* (2013.01); *C11D 1/90* (2013.01); *C11D 2111/16* (2024.01)

(58) Field of Classification Search

CPC ......... C11D 1/94; C11D 3/046; C11D 3/3707; C11D 1/146; C11D 1/22; C11D 1/29; C11D 1/90; C11D 2111/16; C11D 2111/14; C11D 17/003; C11D 1/92

USPC .......................................................... 510/237

See application file for complete search history.

(56) References Cited

U.S. PATENT DOCUMENTS

| | | | |
|---|---|---|---|
| 6,015,780 | A | 1/2000 | Llosas Bigorra et al. |
| 9,023,786 | B2 | 5/2015 | Schmiedel et al. |
| 2002/0069900 | A1 | 6/2002 | Evers |
| 2006/0251602 | A1 | 11/2006 | Goddinger et al. |
| 2009/0036345 | A1 | 2/2009 | Kulbick et al. |
| 2018/0179468 | A1 | 6/2018 | Meier et al. |
| 2019/0024020 | A1 | 1/2019 | Buisker et al. |
| 2022/0064569 | A1 | 3/2022 | Vinson et al. |

FOREIGN PATENT DOCUMENTS

| | | | | | |
|---|---|---|---|---|---|
| CN | 1075161 | A | | 8/1993 | |
| CN | 104263545 | | | 9/2014 | |
| CN | 108603141 | A | * | 9/2018 | ........... C11D 3/0026 |
| CN | 108841463 | | | 11/2018 | |
| CN | 109337768 | A | | 2/2019 | |
| CN | 110139921 | A | | 8/2019 | |
| CN | 116529349 | | | 8/2023 | |
| EP | 0 193 386 | A2 | | 9/1986 | |
| EP | 0193386 | | | 9/1986 | |
| EP | 1074606 | | | 2/2001 | |
| EP | 1167500 | | | 1/2002 | |
| EP | 1167500 | A1 | | 1/2002 | |
| EP | 2304010 | | | 10/2017 | |
| EP | 3670639 | | | 6/2020 | |
| EP | 3670639 | A1 | | 6/2020 | |
| EP | 3730596 | A1 | * | 10/2020 | ............... C11D 1/94 |
| GB | 2528693 | | | 2/2016 | |
| JP | 2013082844 | | | 10/2011 | |
| KR | 100481815 | B1 | | 4/2005 | |
| WO | 98/00498 | A1 | | 1/1998 | |
| WO | WO9925800 | | | 5/1999 | |
| WO | WO16002522 | | | 6/2014 | |
| WO | WO2016010501 | | | 1/2016 | |
| WO | 2016/030226 | A1 | | 3/2016 | |
| WO | WO2016030226 | | | 3/2016 | |
| WO | WO17144677 | | | 8/2017 | |
| WO | WO2018095695 | | | 5/2018 | |
| WO | 2020/126592 | A1 | | 6/2020 | |
| WO | WO 2020/126601 | A1 | * | 6/2020 | ............... C11D 1/37 |
| WO | WO2020126592 | | | 6/2020 | |
| WO | WO2020126601 | | | 6/2020 | |
| WO | 2022/122331 | A1 | | 6/2022 | |
| WO | WO2022122331 | | | 6/2022 | |
| WO | WO2022122332 | | | 6/2022 | |
| WO | WO2022122480 | | | 6/2022 | |
| WO | WO2022122559 | | | 6/2022 | |

* cited by examiner

*Primary Examiner* — Eisa B Elhilo
(74) *Attorney, Agent, or Firm* — Ipsilon USA—NLO

(57) ABSTRACT

The present invention relates to liquid aqueous detergent compositions comprising a surfactant system comprising a primary surfactant being anionic surfactant and a secondary surfactant being amphoteric surfactant whilst the surfactant system is free of alkylbenzene sulphonates and derivatives thereof. The invention further relates to a method of cleaning a stainless-steel hard surface using the composition of the invention, as well as the use thereof.

14 Claims, No Drawings

HARD SURFACE CLEANING COMPOSITION

FIELD OF THE INVENTION

The present invention relates to hard surface cleaning compositions, in particular liquid aqueous detergent compositions comprising a surfactant system providing for good foam and cleaning performance on stainless-steel hard surfaces, such as stainless-steel dishware.

BACKGROUND OF THE INVENTION

Household cleaning activities involve the use of a detergent product and water to rinse off the detergent product and finish the cleaning process. These activities are typically performed daily, often more than once a day, such as dish washing. That is, hard surface cleaning, dishwashing and other household cleaning activities are time consuming activities and, ideally, can be optimized when using products with excellent detergency and soil removal capacity.

Dishwashing can be done in an automated dishwasher, often referred to as machine dishwashing; or by hand, often referred to as hand dishwashing. For hand dishwashing consumers use visual cues to determine if the dishware has been adequately cleaned. One such cue is foam formation. When no foam is formed when washing up, the user may think the cleaning liquid used is not able to clean anymore. For stainless-steel dishware, especially popular in South Asia, consumers are also sensitive to ‘water splitting’. When a stainless-steel dishware item, like e.g. a plate, is cleaned with an implement dipped in cleaning liquid, like e.g. a sponge, the plate is rinsed with water to remove the foam and emulsified soil. On a stainless-steel surface, water will be repelled if the surface is rendered hydrophobic, e.g. because of traces of fatty soil. This will show as ‘water splitting’, meaning that water is visible as discrete droplets. If a stainless-steel surface is hydrophilic, water will cover the surface as a more or less continues sheet of water—this is referred to as ‘water sheeting’. A consumer associates water sheeting with a clean plate. Water splitting on the other hand is associated with the plate still being dirty.

Nowadays, some consumers prefer cleaning products with a good environmental profile. That is, they prefer products that are ‘eco-friendly’ and have less or no impact on the environment when the product is used but also when the product is manufactured. There are many cleaning products on the market that claim to be ‘eco-friendly’ or ‘natural’, but it is not always easy for consumers to understand what those positive terms really stand for. In addition, some consumers still associate ‘eco-friendly’ cleaning products with less efficacious cleaning products.

The Renewable Carbon Index (RCI) is a way to quantify the ‘eco-friendly’ profile of ingredients and products. The higher the RCI the better the renewable profile of the ingredient or product is. A further refined version of such an index is the Biorenewable Carbon Index (BCI) wherein at least part of the carbon in an ingredient or product is derived from recently living plant or animal organisms.

The surfactant system in cleaning product contributes to the cleaning efficacy in such products. The RCI and BCI of surfactants may widely vary with some having a high RCI or BCI, like alkyl polyglycosides (APG) and rhamnolipids, because of their very nature, and other surfactants that are simply not available from a renewable source. It may not always be possible to formulate surfactant systems solely with surfactants like APG and rhamnolipids because of supply, cost and/or formulation restraints, and sometimes such surfactant mixes do not match the desired cleaning profile. Some of the most widely used surfactants are not (cost effectively) available as ingredients with a high RCI or BCI, like for example alkylbenzene sulphonates (ABS).

In view of the above, there remains a need for a hard surface cleaning composition with a good environmental profile without compromising consumer satisfaction in terms of cleaning perception and performance and/or for example foam formation.

SUMMARY OF THE INVENTION

The inventors have developed a liquid detergent composition providing improved visual cues like foam and water sheeting, especially on stainless-steel hard surfaces.

Accordingly, in a first aspect, the invention relates to a liquid aqueous detergent composition comprising, a. 8 to 30 wt % of a surfactant system comprising,
   i. primary surfactant being anionic surfactant comprising
      a surfactant A of formula I: $(R_1—(OR')_n—O—SO_3^-)_xM^{x+}$,
   wherein:
   $R_1$ is saturated or unsaturated C8-C16 alkyl chain;
   R' is ethylene;
   n is from 1 to 18;
   x is equal to 1 or 2;
   $M^{x+}$ is a suitable cation which provides charge neutrality selected from sodium, calcium, potassium and magnesium; and a surfactant B of formula II: $(R_1—O—SO_3^-)_xM^{x+}$,
   wherein:
   $R_1$ is saturated or unsaturated C8-C16 alkyl chain;
   x is equal to 1 or 2;
   $M^{x+}$ is a suitable cation which provides charge neutrality selected from sodium, calcium, potassium and magnesium; and
   ii. secondary surfactant being amphoteric surfactant comprising betaine;
b. 0.1 to 5 wt % of an inorganic salt selected from the group consisting of sodium chloride, magnesium sulphate, sodium sulphate and combinations thereof;

wherein the weight ratio of surfactant A to surfactant B is in the range from 2:1 to 1:2.5;
wherein the surfactant system is free of alkylbenzene sulphonates and derivatives thereof; and
wherein the weight ratio of primary surfactant to secondary surfactant is in the range from 4:1 to 13:1.

The invention further relates to a method of cleaning a hard surface using the composition of the invention, as well as the use thereof.

DETAILED DESCRIPTION OF THE INVENTION

Any feature of one aspect of the present invention may be utilized in any other aspect of the invention. The word “comprising” is intended to mean “including” but not necessarily “consisting of” or “composed of.” In other words, the listed steps or options need not be exhaustive. Except in the operating and comparative examples, or where otherwise explicitly indicated, all numbers in this description indicating amounts of material or conditions of reaction, physical properties of materials and/or use are to be understood as modified by the word “about”. Numerical ranges expressed in the format “from x to y” are understood to include x and y. When for a specific feature multiple preferred ranges are described in the format "x to y", it is understood that all ranges combining the different endpoints are also contemplated. Unless specified otherwise, amounts as used herein are expressed in percentage by weight based on total weight of the composition and is abbreviated as "wt %". The use of any and all examples or exemplary language e.g. "such as" provided herein is intended merely to better illuminate the invention and does not in any way limit the scope of the invention otherwise claimed. Room temperature is defined as a temperature of about 25 degrees Celsius.

Aqueous Detergent Composition

The composition of the present invention is an aqueous cleaning composition, that is to say, the composition comprises water. The amount of water will depend on the desired concentration of the other ingredients. Preferably the composition comprises 60 to 92 wt % water, more preferably not less than 62 w %%, still more preferably not less than 65 wt % but typically not more than 85 wt %, more preferably not more than 80 wt %, still more preferably not more than 75 wt %.

The composition is liquid, that is, it can be poured. Compositions of the present invention preferably have a viscosity in the range of 1000 to 2700 cps at 21 $sec^{-1}$ measured on a Haake Viscometer (Models include VT181, VT501, VT550 or equivalent) with "cup" and "bob" geometry, equipped with a MV cup and a MV2 bob at a controlled temperature of 25° C. Preferably 1500 to 2500 and more preferably 1700 to 2300. Thicker compositions are sometimes preferred by users as these may be easier to dose. For compositions with lower amounts of surfactant, a thick product may also validate appropriate cleaning power perception with users of such compositions.

Surfactant System

The composition of the present invention comprises a surfactant system. The surfactant system comprises at least primary and secondary surfactant wherein the weight ratio of primary surfactant to secondary surfactant is in the range from 4:1 to 13:1. Preferably the weight ratio is from 6:1 to 12:1, more preferably 8:1 to 11:1.

The surfactant system is present in the composition in a concentration of 8 to 30 wt %. Preferably the weight ratio of the surfactant system is 8 to 25 wt %, more preferably 8 to 20 wt % and even more preferably 10 to 20 wt %.

Primary Surfactant

The primary surfactant is an anionic surfactant comprising a surfactant A of the formula (Formula I):

$$(R_1—(OR')_n—O—SO_3^-)_xM^{x+}, \text{ wherein:}$$

$R_1$ is saturated or unsaturated C8-C16, preferably C12-C14 alkyl chain; preferably, $R_1$ is a saturated C8-C16, more preferably a saturated C12-C14 alkyl chain;

$R'$ is ethylene;

n is from 1 to 18, preferably from 1 to 15, more preferably from 1 to 10, still more preferably from 1 to 5;

x is equal to 1 or 2;

$M^{x+}$ is a suitable cation which provides charge neutrality, preferably sodium, calcium, potassium, or magnesium, more preferably a sodium cation.

Preferably, the primary surfactant comprises as surfactant A sodium lauryl ether sulphate having 1 to 3 ethylene oxide units per molecule, more preferably, sodium lauryl ether sulphate having 1 to 2 ethylene oxide units per molecule.

The primary surfactant further comprises a surfactant B of the formula (Formula II):

$$(R_1—O—SO_3^-)_xM^{x+}, \text{ wherein:}$$

$R^1$ is saturated or unsaturated C8-C16, preferably C12-C14 alkyl chain; preferably, $R_1$ is a saturated C8-C16, more preferably a saturated C12-C14 alkyl chain;

x is equal to 1 or 2;

$M^{x+}$ is a suitable cation which provides charge neutrality, preferably sodium, calcium, potassium, or magnesium, more preferably a sodium cation.

Examples of surfactant B include sodium lauryl sulphate. Suitable examples include alkyl sulphates from synthetic origin with trade names Safol 23, Dobanol 23A or 23S, Lial 123 S, Alfol 1412S, Empicol LC3, Empicol 075SR. Further suitable examples, and preferred, include alkyl sulphates commercially available from natural sources with trade names Galaxy 689, Galaxy 780, Galaxy 789, Galaxy 799 SP.

The weight ratio of surfactant A to surfactant B is in the range from 2:1 to 1:2.5, preferably in the range of 1.5:1 to 1:2.

Preferably the primary surfactant comprises at least 70 wt %, calculated on total amount of primary surfactant, of surfactant A and surfactant B. More preferably at least 80 wt %, even more preferably at least 90 wt % and still more preferably at least 95 wt %. It may be preferred that the primary surfactant consists of surfactant A and surfactant B.

The primary surfactant may comprise other anionic surfactants such as rhamnolipids, being anionic biosurfactants.

Primary surfactant may be present in a concentration of 80 to 93 wt %, preferably 85 to 92 wt % and more preferably 89 to 92 wt % by total weight of the surfactant system.

Secondary Surfactant

The secondary surfactant is amphoteric surfactant comprising betaine.

Preferably the secondary surfactant comprises at least 70 wt %, calculated on total amount of secondary surfactant, of betaine. More preferably at least 80 wt %, even more preferably at least 90 wt % and still more preferably at least 95 wt %. It may be preferred that the secondary surfactant consists of betaine.

Secondary surfactant may be present in a concentration of 7 to 20 wt %, preferably 8 to 14 wt % and more preferably 8 to 12.5 wt % by total weight of the surfactant system.

Betaine

The amphoteric surfactant comprises betaine. Suitable betaines include alkyl betaine, alkyl amido betaine, alkyl amidopropyl betaine, alkyl sulphobetaine and alkyl phosphobetaine, wherein the alkyl groups preferably have from 8 to 19 carbon atoms. Examples include cocodimethyl sulphopropyl betaine, cetyl betaine, laurylamidopropyl betaine, caprylate/caprate betaine, capryl/capramidopropyl betaine, cocamidopropyl hydroxysultaine, cocobutyramido hydroxysultaine, and preferably lauryl betaine, cocamidopropyl betaine and sodium cocamphopropionate. Preferably the betaine is cocamidopropyl betaine (CAPB).

Further Surfactants

The surfactant system of the present invention may comprise other types of surfactants in addition to the anionic surfactant of the primary surfactant and amphoteric surfactant of the secondary surfactant. More specifically the surfactant system may also comprise cationic and/or non-ionic surfactant.

Suitable non-ionic surfactants include the condensation products of a higher alcohol (e.g. an alkanol containing about 8 to 18 carbon atoms in a straight or branched chain configuration) condensed with about 5 to 30 moles of ethylene oxide, for example, lauryl or myristyl alcohol condensed with about 16 moles of ethylene oxide (EO), tridecanol condensed with about 6 moles of EO, myristyl alcohol condensed with about 10 moles of EO per mole of myristyl alcohol, the condensation product of EO with a cut of coconut fatty alcohol containing a mixture of fatty alcohols with alkyl chains varying from 10 to about 14 carbon atoms in length and wherein the condensate contains either about 6 moles of EO per mole of total alcohol or about 9 moles of EO per mole of alcohol and tallow alcohol ethoxylates containing 6 EO to 11 EO per mole of alcohol. Particularly preferred is Lauryl alcohol condensed with 5, 7 and 9 moles of ethylene oxide (Laureth 5, Laureth 7 and Laureth 9). Preferably, the non-ionic surfactant is selected from Laureth 5, Laureth 7 and Laureth 9, or mixtures thereof.

Condensates of 2 to 30 moles of ethylene oxide with sorbitan mono- and tri-C10-C20 alkanoic acid esters having a HLB of 8 to 15 also may be employed as the nonionic surfactant. These surfactants are well known and are available from Imperial Chemical Industries under the Tween trade name. Suitable surfactants include polyoxyethylene (4) sorbitan monolaurate, polyoxyethylene (4) sorbitan monostearate, polyoxyethylene (20) sorbitan trioleate and polyoxyethylene (20) sorbitan tristearate.

Another nonionic surfactant that may be employed are alkyl polyglycosides. These may be preferred as these have a high Renewable Carbon Index (RCI) and Biorenewable Carbon Index (BCI).

When present, the non-ionic surfactant is in a concentration of 0.1 to 5% by weight, preferably at least 0.3%, still more preferably at least 0.5% but preferably not more than 4%, more preferably not more than 3%, even more preferably not more than 2% by weight of the surfactant system.

Some surfactants are known to have other functions as well and are sometimes classified as such although it is commonly known that such ingredients are also surfactants. For example, benzalkonium chloride (BKC) is a known cationic surfactant that can also be employed as an antimicrobial agent. For the purpose of the present invention such ingredients are taken into account for the calculation of weight percentages of surfactant.

Renewable Carbon Index (RCI) and Biorenewable Carbon Index (BCI)

Renewable carbon is defined as carbon derived from recently living plant or animal organisms (as opposed to carbon derived from fossil carbon which is coal, oil or petroleum based), as well as carbon derived from $CO_2$ capture.

Biorenewable carbon is defined as carbon derived from recently living plant or animal organisms and as such has no carbon derived from fossil carbon which is coal, oil or petroleum based.

In the context of the present invention, RCI is defined as the value calculated by dividing the number of renewable carbons by the total number of carbons in the entire molecule, and BCI is defined as the value calculated by dividing the number of biorenewable carbons by the total number of carbons in the entire molecule. For example, if 80% of the number of carbons present in a surfactant system is renewable carbon then the RCI is 0.8.

Preferably the liquid detergent composition of the present invention comprises a surfactant system having a RCI of at least 0.85, more preferably at least 0.9 and even more preferably at least 0.95. Ideally the surfactant system has a RCI of 1.

For liquid detergent compositions that require an 'eco' label it will be understood that the surfactant system preferably has a BCI of at least 0.8. Preferably a BCI of at least 0.85, more preferably at least 0.9 and even more preferably at least 0.95. Ideally the surfactant system has a BCI of 1.

Alkylbenzene Sulphonates (ABS)

ABS is not readily available from renewable carbon or biorenewable carbon sources. Therefore, any amount of ABS in the surfactant system of compositions of the present invention will not contribute to the RCI or BCI of the surfactant system. Therefore the surfactant system of the present composition is free of alkylbenzene sulphonates and derivatives thereof.

Alkylbenzene sulphonates (ABS) and derivatives thereof include water-soluble alkali metal salts of organic sulphonates having alkyl radicals typically containing from about 8 to about 22 carbon atoms, preferably 8 to 18 carbon atoms, still more preferably 12 to 15 carbon atoms and may be saturated or unsaturated. Examples include sodium salt of linear alkylbenzene sulphonate, alkyl toluene sulphonate, alkyl xylene sulphonate, alkyl phenol sulphonate, alkyl naphthalene-sulphonate, ammonium diamylnaphthalene-sulphonate and sodium dinonylnaphthalene-sulphonate and mixtures with olefin sulphonates.

Inorganic Salts

The composition comprises 0.1 to 5% by weight of an inorganic salt selected from the group consisting of sodium chloride, magnesium sulfate, sodium sulfate and combinations thereof. Inorganic salts advantageously control the viscosity of the detergent compositions.

Preferably, liquid detergent composition comprises 0.5 to 4%, more preferably 1.0 to 3%, even more preferably 1.5 to 2.5% by weight of an inorganic salt.

Polyethylene Oxide

The liquid detergent composition of the present invention may optionally comprise polyethylene oxide having a molecular weight higher than 200,000 g/mol. The polyethylene oxide may be present as a single compound or a mixture of at least two polyethylene oxides having a molecular weight higher than 200,000 g/mol.

As used herein, 'polyethylene oxide' refers to polyethylene oxides (PEO) or high molecular weight polyethylene glycols (PEGs). As used herein, 'high molecular weight polyethylene glycol' means a linear homopolymer derived from ethylene oxide and having a molecular weight of at least 200,000 g/mol, like for example 200,000 g/mol to 4,000,000 g/mol.

Preferably, the polyethylene oxide has a molecular weight of 300,000 g/mol to 4,000,000 g/mol, more preferably 500,000 g/mol to 3,000,000 g/mol, even more preferably 1,000,000 to 2,000,000 g/mol.

Suitable examples include, but are not limited to, polyethylene oxides commercially available with trade names WSR N-10, WSR N-80, WSR N-750, WSR 205, WSR 1105, WSRN-12K, WSR N-60K, WSR-301, WSR-303, WSR-308, all from The Dow Chemical Company; polyethylene oxide (PEO) from MSE, Beantown chemicals or Acros Organics; PEO 100K from Polysciences; PEO-1, PEO2, PEO-3, PEO-4, PEO-8, PE015, PEO-18, PEO-57, PEO-29 from Sumitomo Seika Chemicals Ltd.; or ALKOX polyethylene Glycol from Meisei Chemical Works.

If present, the polyethylene oxide is present in an amount of 0.001 to 0.2 wt. % based on the total weight of the composition. Preferably, the polyethylene oxide is present in an amount of 0.01 to 0.18, more preferably 0.1 to 0.15 wt. %)/0.

pH of the Composition

Preferably the pH of the composition of the present invention is between 4.0 to 8.0. Preferably, the pH is 4.5 and 7.5, preferably between 4.5 and 7.0, more preferably between 5.0 and 6.5.

Optional Ingredients

The composition according to the invention may contain other ingredients which aid in the cleaning or sensory performance. Compositions according to the invention can also contain, in addition to the ingredients already mentioned, various other optional ingredients such as thickeners, colorants, preservatives, fatty acids, anti-microbial agents, perfumes, pH adjusters, sequestrants, alkalinity agents and hydrotropes.

Organic Solvents

Preferred compositions do not contain large amounts of organic solvents, usually added to boost cleaning performance, that is from 0 to 1 wt % organic solvent. Preferably the composition is free of organic solvents.

Silicones

Compositions of the present invention preferably comprise only limited amounts of silicones as these may not provide the required user characteristics for cleaning compositions of the present invention. Silicones may for example leave a 'slippery' feel to the hard surface. Therefore, the composition of the present invention preferably comprises from 0 to 1 wt %, more preferably from 0 to 0.5 wt % and still more preferably from 0 to 0.1 wt % silicones. Still more preferably the composition is free of silicones.

Product Format

The composition may be used neat or diluted. For hard surface cleaning or more specifically for dishwashing purposes, the composition is typically applied neat directly to the surface or on an implement like for example a sponge or cloth. When applied in a diluted form, the composition is preferably diluted with water in a ratio of between 1:1 to 1:100 and more preferably in a ratio of between 1:1 to 1:10.

The composition may be packaged in the form of any commercially available bottle for storing the liquid.

The bottle containing the liquid can be of different sizes and shapes to accommodate different volumes of the liquid; preferably between 0.25 and 2 L, more preferably between 0.25 and 1.5 L or even between 0.25 and 1 L. The bottle is preferably provided with a dispenser, which enables the consumer an easier mode of dispersion of the liquid. Spray or pump-dispensers may also be used.

Process

The invention also relates to a method of cleaning a stainless-steel hard surface comprising the steps:

a. contacting the hard surface, optionally in diluted form, with the liquid detergent composition of the present invention, and
b. removing the detergent composition from the hard surface by rinsing with water.

Preferably, the method of cleaning is a manual cleaning, more preferably hand dishwashing.

'Hard surface', as used herein, typically means utensils or kitchenware, kitchen worktops, sinks and kitchen counter tops. Preferably the hard surface is stainless-steel dishware.

In a further aspect, the invention relates to the use of a liquid detergent composition of the invention for handwashing stainless-steel hard surfaces, preferably stainless-steel dishware.

In any of the processes above, the composition of the invention is applied onto a hard surface in neat or diluted form. The composition may be applied by any known ways such as by using a cleaning implement, such as scrub, sponge paper, cloth, wipes or any other direct or indirect application. The applied composition may be cleaned using a cleaning implement such as a scrub, sponge, paper, cloth or wipes with water, or rinsed off with water, optionally running water.

The invention will now be illustrated by means of the following non-limiting examples.

EXAMPLES

Standard Soil

A standard soil mix was prepared by mixing the ingredients as in Table 1.

TABLE 1

| Standard soil mix | |
|---|---|
| Ingredient | Grams |
| Stearic acid | 1.25 |
| Oleic acid | 1.25 |
| Sunflower oil | 47.5 |
| Wheat flour | 50 |
| Water (5 FH) | To 500 |

Soiled Plates

Soiled stainless-steel plates were prepared using the following protocol.

1. 1.5 ml of standard soil is dispensed on a clean and dry stainless-steel plate with a diameter of 20 cm. The plate being at room temperature.
2. The soil is spread evenly over the front surface the plate with a rubber bung and left to age for 15 minutes.
3. 5 ml of water sprayed over the surface of the plate to wet the plate.
4. The wetted soil is left to age for another 15 minutes.
5. The soiled plate is now ready for being used in the cleaning test.

Cleaning Liquor

A cleaning liquor is prepared by mixing 3.75 grams of cleaning composition in 40 grams of water. This is the 'test solution'.

Cleaning Test

1. A wetted green pad (Scotch Brite abrasive scrub pad ex 3M, 224×158 mm) is folded exactly at the middle.
2. The wetted green pad is dipped into the test solution. The pad is then used to touch the soiled plate on three points.
3. The plate is scrubbed on the front side 6 times clockwise and 6 times anticlockwise covering the entire plate surface.
4. The sides (i.e. rim) is rubbed for 5 times with 3 strokes each. The back of the plate is scrubbed 3 times clockwise and 3 times anticlockwise.
6. The foam level on each plate is visually assessed and reported as foam (F), low foam (L) and no foam (N).
7. The plate is rinsed under running water followed by observing the water splitting pattern and reported as water splitting (X) or water sheeting (C).

Steps 3 to 7 are repeated with another soiled plate until no foam is observed at step 6. The plates are referred to as first plate (1S), second plate (2S), third plate (3S), etc.

Cleaning Compositions

Cleaning compositions were prepared according to Table 2. For each of the prepared cleaning compositions the cleaning test was done. The results of the cleaning test can be found in Table 3.

TABLE 2

(wt % calculated in total product, water to 100)

| Sample | SLES | CAPB | PAS | LAS | $Na_2SO_4$ |
|---|---|---|---|---|---|
| 1 | 6.24 | 1.57 | 10.2 | — | 1 |
| 2 | 6.24 | — | 10.2 | — | 1 |
| 3 | 6.24 | 2.7 | — | — | 1 |
| 4 | — | 1.57 | 7.5 | — | 1 |
| 5 | — | 1.57 | 7.5 | 8.94 | 1 |
| 6 | 6.24 | 1.57 | 2.7 | 7.5 | 1 |
| 7 | 6.24 | — | 10.2 | 1.57 | 1 |
| 8 | 6.24 | — | 11 | — | 1 |
| 9 | 11.51 | 1.57 | 4.93 | — | 1 |
| 10 | — | 1.57 | 16.44 | — | 1 |
| 11 | 6.24 | 1.57 | 10.2 | 1 | 1 |
| 12 | 6.24 | 1.57 | 10.2 | 5 | 1 |
| 13 | 6.24 | 1.57 | 10.2 | 7.5 | 1 |
| 14 | 6.24 | 1.57 | 10.2 | 2.5 | 1 |
| 15 | 3.13 | 1.57 | 13.31 | — | 1 |
| 16 | 8.88 | 1.57 | 7.56 | — | 1 |

SLES: Galaxy™ LES 170, ex Galaxy Surfactants Ltd., C12-C14 natural, 1EO; CAPB: Galaxy™ CAPB SB, ex Galaxy Surfactants Ltd., C12-C18 natural; PAS: Galaxy™ 780, ex Galaxy Surfactants Ltd., C12-C14 natural; LAS: LABSA, ex Fogla Corp.

TABLE 3

Cleaning Test Results

| | Foam | | | | Water splitting | | | |
|---|---|---|---|---|---|---|---|---|
| Sample | 1S | 2S | 3S | 4S | 1S | 2S | 3S | 4S |
| 1 | F | F | L | N | C | C | C | C |
| 2 | F | N | — | — | C | C | — | — |
| 3 | F | L | N | — | C | C | C | — |
| 4 | F | N | — | — | X | C | — | — |
| 5 | F | L | N | — | X | X | X | — |
| 6 | F | L | N | — | X | X | X | — |
| 7 | F | L | N | — | X | X | X | — |
| 8 | F | F | N | — | C | C | C | — |
| 9 | F | F | N | — | C | C | C | — |
| 10 | F | F | N | — | C | C | C | — |
| 11 | F | L | N | — | X | X | X | — |
| 12 | F | F | N | — | X | X | X | — |
| 13 | F | F | N | — | X | X | X | — |
| 14 | F | L | N | — | X | X | X | — |
| 15 | F | L | N | — | X | C | C | — |
| 16 | F | F | L | N | C | C | C | — |

F = foam;
L = low foam;
N = no foam;
X = water splitting;
C = water sheeting

Samples 1 and 16 provide for adequate foam formation and proper water sheeting.

The invention claimed is:

1. A liquid aqueous detergent composition comprising, a. 8 to 30 wt % of a surfactant system comprising, i. primary surfactant being anionic surfactant comprising a surfactant A of formula I: $(R_1—(OR')_n—O-SO3-)_xMx+$, wherein:

$R_1$ is saturated or unsaturated $C_8$-$C_{16}$ alkyl chain;

R' is ethylene;

n is from 1 to 18;

x is equal to 1 or 2;

$M^{x+}$ is a suitable cation which provides charge neutrality selected from sodium, calcium, potassium and magnesium; and a surfactant B of formula II: $(R_1—O—SO_3-)_xM^{x+}$, wherein:

$R_1$ is saturated or unsaturated $C_8$-$C_{16}$ alkyl chain;

x is equal to 1 or 2;

$M^{x+}$ is a suitable cation which provides charge neutrality selected from sodium, calcium, potassium and magnesium; and ii. secondary surfactant being amphoteric surfactant comprising betaine;

b. 0.1 to 5 wt % of an inorganic salt selected from the group consisting of sodium chloride, magnesium sulphate, sodium sulphate and combinations thereof;

wherein the weight ratio of surfactant A to surfactant B is in the range from 2:1 to 1:2.5;

wherein the surfactant system is free of alkylbenzene sulphonates and derivatives thereof; and wherein the weight ratio of primary surfactant to secondary surfactant is in the range from 4:1 to 13:1.

2. The composition according to claim 1, wherein the primary surfactant comprises sodium lauryl ether sulphate having 1 to 2 ethylene oxide units per molecule.

3. The composition according to claim 1, wherein the weight ratio of surfactant A to surfactant B is in the range of 1.5:1 to 1:2.

4. The composition according to claim 1, wherein the secondary surfactant comprises betaine selected from alkyl betaine, alkyl amido betaine, alkyl amidopropyl betaine, alkyl sulphobetaine, alkyl phosphobetaine and combinations thereof.

5. The composition according to claim 4, wherein the betaine is cocamidopropyl betaine (CAPB).

6. The composition according to claim 1, wherein the amount of surfactant system is from 8 to 25 wt %.

7. The composition according to claim 1, wherein the weight ratio of primary surfactant to secondary surfactant is in the range from 6:1 to 12:1.

8. The composition according to claim 1, wherein the composition has a pH in the range of 4 to 8.

9. The composition according to claim 1, wherein the composition has a viscosity in the range of 1000 to 2700 cps at 21 $sec^{-1}$ measured on a Haake Viscometer (Models include VT181, VT501, VT550 or equivalent) with "cup" and "bob" geometry, equipped with a MV cup and a MV2 bob at a controlled temperature of 25° C.

10. The composition according to claim 1, comprising 0.001 to 0.2 wt % of polyethylene oxide having a molecular weight higher than 200,000 g/mol.

11. The composition according to claim 10, wherein the polyethylene oxide has a molecular weight of 500,000 g/mol to 3,000,000 g/mol.

12. The composition according to claim 1, wherein the surfactant system has a Renewable Carbon Index (RCI) of at least 0.85.

13. A method of cleaning a stainless-steel hard surface comprising the steps:

a. contacting the hard surface, optionally in diluted form, with the liquid detergent composition comprising, a. 8 to 30 wt % of a surfactant system comprising, i. primary surfactant being anionic surfactant comprising a surfactant A of formula I: $(R_1—(OR')_n—O-SO3-)_xMx+$, wherein:

$R_1$ is saturated or unsaturated $C_8$-$C_{16}$ alkyl chain;

R' is ethylene;

n is from 1 to 18;

x is equal to 1 or 2;

$M^{x+}$ is a suitable cation which provides charge neutrality selected from sodium, calcium, potassium and magnesium; and a surfactant B of formula II: $(R_1—O—SO_3-)_xM^{x+}$, wherein:

$R_1$ is saturated or unsaturated $C_8$-$C_{16}$ alkyl chain;

x is equal to 1 or 2;

$M^{x+}$ is a suitable cation which provides charge neutrality selected from sodium, calcium, potassium and magnesium; and ii. secondary surfactant being amphoteric surfactant comprising betaine;

b. 0.1 to 5 wt % of an inorganic salt selected from the group consisting of sodium chloride, magnesium sulphate, sodium sulphate and combinations thereof;

wherein the weight ratio of surfactant A to surfactant B is in the range from 2:1 to 1:2.5;

wherein the surfactant system is free of alkylbenzene sulphonates and derivatives thereof; and wherein the weight ratio of primary surfactant to secondary surfactant is in the range from 4:1 to 13:1, and b. removing the detergent composition from the hard surface by rinsing with water.

14. The method of cleaning according to claim 13, wherein the hard surface is stainless-steel dishware.

* * * * *